US012658543B2

(12) United States Patent
Xu et al.

(10) Patent No.: US 12,658,543 B2
(45) Date of Patent: Jun. 16, 2026

(54) ELECTRODE ASSEMBLY, BATTERY CELL, BATTERY, DEVICE, MANUFACTURING METHOD, AND MANUFACTURING DEVICE

(71) Applicant: CONTEMPORARY AMPEREX TECHNOLOGY (HONG KONG) LIMITED, Hong Kong (CN)

(72) Inventors: Hu Xu, Ningde (CN); Xing Li, Ningde (CN); Haizu Jin, Ningde (CN); Shaojun Niu, Ningde (CN); Miaomiao Ren, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 831 days.

(21) Appl. No.: 17/818,001

(22) Filed: Aug. 8, 2022

(65) Prior Publication Data

US 2022/0376371 A1     Nov. 24, 2022

Related U.S. Application Data

(63) Continuation of application No. PCT/CN2021/076296, filed on Feb. 9, 2021.

(51) Int. Cl.
*H01M 50/70*          (2021.01)
*H01M 10/0525*          (2010.01)
(Continued)

(52) U.S. Cl.
CPC ....... *H01M 50/70* (2021.01); *H01M 10/0525* (2013.01); *H01M 10/0587* (2013.01);
(Continued)

(58) Field of Classification Search
CPC .. H01M 50/70; H01M 50/107; H01M 50/528; H01M 50/152; H01M 50/627;
(Continued)

(56) References Cited

U.S. PATENT DOCUMENTS

| | | | |
|---|---|---|---|
| 6,387,561 B1 | 5/2002 | Nemoto et al. | |
| 6,858,342 B2 | 2/2005 | Nemoto et al. | |

(Continued)

FOREIGN PATENT DOCUMENTS

| | | |
|---|---|---|
| CN | 1706059 A | 12/2005 |
| CN | 111261948 A | 6/2020 |

(Continued)

OTHER PUBLICATIONS

English translation of JP 2001-093511 A obtained from Google Patents (Year: 2001).*

(Continued)

*Primary Examiner* — Kimberly Wyluda
(74) *Attorney, Agent, or Firm* — K&L Gates LLP

(57)     ABSTRACT

An electrode assembly, a battery cell, a battery, a device, a manufacturing method, and a manufacturing device are provided. In some embodiments, the electrode assembly includes at least two electrode plates, including a first electrode plate and a second electrode plate that are of opposite polarities. The first electrode plate and the second electrode plate are wound around a winding axis to form a multilayer structure. The multilayer structure includes an accommodation cavity extending along a direction of the winding axis. The accommodation cavity is configured to accommodate an electrolytic solution. The electrode assembly further includes at least one guide path extending along a first direction. The first direction is a direction perpendicular to the winding axis. The guide path is configured to guide the electrolytic solution out of the accommodation cavity.

12 Claims, 15 Drawing Sheets

100

133

(51) Int. Cl.

| | |
|---|---|
| *H01M 10/0587* | (2010.01) |
| *H01M 50/107* | (2021.01) |
| *H01M 50/152* | (2021.01) |
| *H01M 50/528* | (2021.01) |
| *H01M 50/627* | (2021.01) |

(52) U.S. Cl.
CPC ....... *H01M 50/107* (2021.01); *H01M 50/152* (2021.01); *H01M 50/528* (2021.01); *H01M 50/627* (2021.01); *H01M 2220/20* (2013.01)

(58) Field of Classification Search
CPC ......... H01M 10/0525; H01M 10/0587; H01M 2220/20

See application file for complete search history.

(56) References Cited

U.S. PATENT DOCUMENTS

| | | | |
|---|---|---|---|
| 7,462,418 | B2 | 12/2008 | Matsumoto |
| 8,263,247 | B2 | 9/2012 | Kim |
| 2002/0106553 | A1 | 8/2002 | Nemoto et al. |
| 2002/0106554 | A1 | 8/2002 | Nemoto et al. |
| 2005/0153194 | A1* | 7/2005 | Kimura ............... H01M 50/627 |
| | | | 429/174 |
| 2006/0035140 | A1 | 2/2006 | Matsumoto |
| 2010/0227209 | A1 | 9/2010 | Kim |
| 2013/0216879 | A1 | 8/2013 | Egawa et al. |
| 2016/0351966 | A1 | 12/2016 | Batson et al. |
| 2019/0348719 | A1 | 11/2019 | Batson et al. |
| 2020/0321669 | A1* | 10/2020 | Kim ................... H01M 10/653 |
| 2023/0253631 | A1 | 8/2023 | Batson et al. |

FOREIGN PATENT DOCUMENTS

| | | | |
|---|---|---|---|
| CN | 212161993 | U | 12/2020 |
| CN | 212161994 | U | 12/2020 |
| CN | 112310569 | A | 2/2021 |
| CN | 111261948 | B | 6/2021 |
| DE | 102018207328 | A1 | 11/2019 |
| EP | 3758086 | A1 | 12/2020 |
| JP | H10162801 | A | 6/1998 |
| JP | 2001093511 | A | 4/2001 |
| JP | 2002237292 | A | 8/2002 |
| JP | 2016207516 | A | 12/2016 |
| KR | 20090037621 | A | 4/2009 |
| WO | 2011064956 | A1 | 6/2011 |
| WO | 2015008142 | A1 | 1/2015 |

OTHER PUBLICATIONS

International Search Report received in corresponding Application PCT/CN2021/076296 on Nov. 2, 2021.

The Extended European Search Report received in corresponding European Application 21916653.5, mailed on Sep. 1, 2023.

The first office action received in counterpart Chinese Application 202180058747.0, mailed on Apr. 17, 2024.

* cited by examiner

100

K

133

100

150

100

150

100

150

300

200

301

400

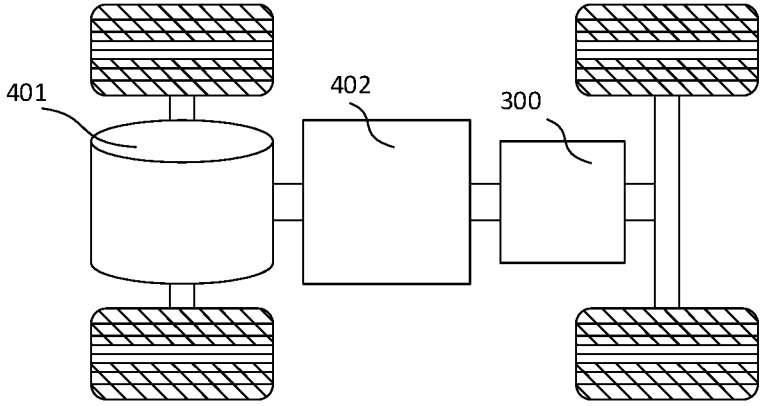

Provide at least two electrode plates, including a positive electrode plate and a negative electrode plate that are of opposite polarities

502

Wind the positive electrode plate and the negative electrode plate around a winding axis to form a multilayer structure, where the multilayer structure includes an accommodation cavity extending along a direction of the winding axis, the accommodation cavity is configured to accommodate an electrolytic solution, at least one guide path extending along a first direction is formed in the electrode assembly after the winding, the first direction is a direction perpendicular to the winding axis, and the guide path is configured to guide the electrolytic solution out of the accommodation cavity

ELECTRODE ASSEMBLY, BATTERY CELL, BATTERY, DEVICE, MANUFACTURING METHOD, AND MANUFACTURING DEVICE

CROSS-REFERENCE TO RELATED APPLICATIONS

This application is a continuation of International Application PCT/CN2021/076296, filed on Feb. 9, 2021 and entitled "ELECTRODE ASSEMBLY, BATTERY CELL, BATTERY, DEVICE, MANUFACTURING METHOD, AND MANUFACTURING DEVICE", which is incorporated herein by reference in its entirety.

TECHNICAL FIELD

This application relates to the field of batteries, and in particular, to an electrode assembly, a battery cell, a battery, a device, a manufacturing method, and a manufacturing device.

BACKGROUND

Due to advantages such as a small size, a high energy density, a high power density, reusability for many cycles, and a long shelf life, batteries such as a lithium-ion battery are widely used in electronic devices, electrical means of transport, electrical toys, and electrical devices. For example, lithium-ion batteries are widely used in products such as a mobile phone, a notebook computer, an electric power cart, an electric vehicle, an electric airplane, an electric ship, an electric toy car, an electric toy ship, an electric toy airplane, and a power tool.

With ongoing development of battery technology, higher requirements are posed on the performance of batteries. An existing battery cell generally includes a housing and an electrode assembly accommodated in the housing, and the housing is filled with an electrolytic solution. The space available for storing the electrolytic solution inside the housing is relatively small, and a transmission rate of the electrolytic solution between electrode plates is relatively slow. Therefore, the electrode plates can hardly be infiltrated sufficiently in a short time, thereby affecting battery performance.

SUMMARY

In view of the foregoing problem, an embodiment provides an electrode assembly, a battery cell, a battery, a device, a manufacturing method, and a manufacturing device to improve the infiltration effect of an electrolytic solution in the electrode assembly.

According to a first aspect, an electrode assembly is provided, including: at least two electrode plates, including a first electrode plate and a second electrode plate that are of opposite polarities. The first electrode plate and the second electrode plate are wound around a winding axis to form a multilayer structure. The multilayer structure includes an accommodation cavity extending along a direction of the winding axis. The accommodation cavity is configured to accommodate an electrolytic solution. The electrode assembly further includes at least one guide path extending along a first direction. The first direction is a direction perpendicular to the winding axis. The guide path is configured to guide the electrolytic solution out of the accommodation cavity.

With the guide path disposed as a transmission path of the electrolytic solution, the electrolytic solution in the accommodation cavity can not only be expelled outward through a gap between the first electrode plate and the second electrode plate, but also be expelled outward through the guide path, thereby increasing transmission paths of the electrolytic solution inside the electrode assembly, and improving the infiltration effect of the electrolytic solution in the electrode assembly.

In some embodiments, an active material region of the first electrode plate and an active material region of the second electrode plate are wound to form a body region. The body region includes a plurality of stacked active material portions. A non-active material region of the first electrode plate or a non-active material region of the second electrode plate is wound to form a tab region. The tab region includes a plurality of stacked tab portions. The accommodation cavity runs through the body region and the tab region along the direction of the winding axis.

In the electrode assembly arranged in this way, because the accommodation cavity runs through the body region and the tab region along the direction of the winding axis, the electrolytic solution in the accommodation cavity can flow into the interior of the body region through an end of the tab region.

In some embodiments, the electrode assembly is a cylindrical structure, and the first direction is a radial direction of the cylindrical structure.

In the cylinder-structured electrode assembly, the guide path extends along the radial direction of the cylindrical structure to guide the electrolytic solution in the accommodation cavity so that the electrolytic solution is transmitted outward along the radial direction. In this way, a relatively fast path is provided for transmitting the electrolytic solution, and the infiltration efficiency of the electrolytic solution in the electrode assembly is improved.

In some embodiments, the plurality of tab portions include a plurality of consecutively arranged first tab portions. Each first tab portion is provided with at least one first hole that runs through along a thickness direction of the first tab portion. The first holes of all the first tab portions are configured to be arranged opposite to each other along the first direction to form the guide path.

The first holes are made on all the consecutively arranged first tab portions, and the first holes are arranged opposite to each other along the first direction to form the guide path. The guide path formed in this way is a continuous through path, and can shorten the transmission path of the electrolytic solution. In this way, the electrolytic solution can flow into a space between two adjacent first tab portions quickly through the guide path, and the electrolytic solution can flow into the interior of the body region.

In some embodiments, an outermost tab portion in the tab region is the first tab portion. An outer end of the guide path is in direct communication with an external space of the electrode assembly.

A guide path with the outer end in direct communication with the external space of the electrode assembly is formed by making the first hole on the first tab portion that is outermost. In this way, the electrolytic solution in the external space of the electrode assembly can flow into the guide path directly, the electrolytic solution can flow into a space between the two adjacent first tab portions quickly through the guide path, and the electrolytic solution can flow into the interior of the body region.

In some embodiments, an innermost tab portion in the tab region is the first tab portion. An inner end of the guide path is in direct communication with the accommodation cavity.

A guide path with the inner end in direct communication with the accommodation cavity is formed by making the first hole on the first tab portion that is innermost. In this way, the electrolytic solution in the accommodation cavity can flow into the guide path directly, the electrolytic solution can flow into a space between the two adjacent first tab portions quickly through the guide path, and the electrolytic solution can flow into the interior of the body region.

In some embodiments, the plurality of tab portions further include a plurality of consecutively arranged second tab portions. The second tab portions are not provided with the first hole. All the plurality of second tab portions are located between the guide path and the accommodation cavity. An inner end of the guide path communicates to the accommodation cavity through a gap between two adjacent second tab portions.

In the electrode assembly disposed in this way, the inner end of the guide path communicates to the accommodation cavity through a gap between two adjacent second tab portions. In this way, the electrolytic solution in the accommodation cavity can flow into the guide path along the gap between two adjacent second tab portions. In addition, the second tab portion is located between the guide path and the accommodation cavity, which is equivalent to that the second tab portion is located at an inner side of the electrode assembly. Therefore, the area of each coil of second tab portion is relatively small. If the first hole is made on the second tab portion, the strength of the second tab portion will be affected. Relatively high strength of the second tab portion is ensured by omitting the first hole on the second tab portion.

In some embodiments, in a direction from outside to inside of the electrode assembly, apertures of the plurality of first holes decrease progressively or are identical.

The area of each coil of active material portion located at the outer side of the electrode assembly is larger than the area of each coil of active material portion located at the inner side of the electrode assembly. Therefore, the former requires a larger amount of electrolytic solution. In a direction from outside to inside of the electrode assembly, the apertures of the plurality of first holes are set to decrease progressively. In this way, the guide path located at the outer side of the electrode assembly is relatively large, and therefore, can meet the relatively great demand for the electrolytic solution for the active material portion located at the outer side of the electrode assembly. In a direction from outside to inside of the electrode assembly, the apertures of the plurality of first holes are set to be identical. Therefore, the first holes of just one size need to be designed and processed, and the difficulty and cost of production are reduced. In some embodiments, the accommodation cavity includes a first accommodation cavity located in the body region and a second accommodation cavity located in the tab region. Along a direction perpendicular to the winding axis, a size of the second accommodation cavity is larger than a size of the first accommodation cavity.

The second accommodation cavity of a relatively large size is provided in the tab region that includes the guide path. The second accommodation cavity can store a relatively large amount of electrolytic solution. The electrolytic solution can flow into the guide path from the second accommodation cavity, thereby not only shortening the transmission path of the electrolytic solution, but also making a relatively large amount of electrolytic solution flow into the guide path, and further increasing the infiltration speed of the electrolytic solution.

In some embodiments, a central axis of the accommodation cavity coincides with the winding axis.

In this way, because the winding axis is located at the center of the electrode assembly, the accommodation cavity is also located at the center of the electrode assembly, thereby equalizing the infiltration effect of the electrolytic solution from the center of the electrode assembly to the outer side.

According to a second aspect, a battery cell is provided, including: a housing, an end cap, and the electrode assembly described in the first aspect above. An opening is made at an end of the housing along the direction of the winding axis. The end cap is configured to close the opening. The electrode assembly is disposed in the housing.

In some embodiments, an injection hole is made on the end cap. The injection hole is disposed opposite to the accommodation cavity along the direction of the winding axis, so that the electrolytic solution is able to enter the accommodation cavity through the injection hole.

With the injection hole disposed opposite to the accommodation cavity along the direction of the winding axis, the electrolytic solution can directly flow into the accommodation cavity after being injected from the injection hole, thereby increasing the transmission speed of the electrolytic solution.

According to a third aspect of embodiments, a battery is provided, including the battery cell described in the second aspect above.

According to a fourth aspect, an electrical device is provided, including the battery described in the third aspect above. The battery is configured to provide electrical energy.

According to a fifth aspect, a method for manufacturing an electrode assembly is provided, including:

providing at least two electrode plates, including a first electrode plate and a second electrode plate that are of opposite polarities; and winding the first electrode plate and the second electrode plate around a winding axis to form a multilayer structure, where the multilayer structure includes an accommodation cavity extending along a direction of the winding axis, the accommodation cavity is configured to accommodate an electrolytic solution, at least one guide path extending along a first direction is formed in the electrode assembly after the winding, the first direction is a direction perpendicular to the winding axis, and the guide path is configured to guide the electrolytic solution out of the accommodation cavity.

According to a sixth aspect, a device for manufacturing an electrode assembly is provided, including:

an electrode plate placing module, configured to provide at least two electrode plates, including a first electrode plate and a second electrode plate that are of opposite polarities; and a winding module, configured to wind the first electrode plate and the second electrode plate around a winding axis to form a multilayer structure, where the multilayer structure includes an accommodation cavity extending along a direction of the winding axis, the accommodation cavity is configured to accommodate an electrolytic solution, at least one guide path extending along a first direction is formed in the electrode assembly after the winding, the first direction is a direction perpendicular to the winding axis, and the guide path is configured to guide the electrolytic solution out of the accommodation cavity.

BRIEF DESCRIPTION OF DRAWINGS

The drawings described herein are intended to enable a further understanding of this application, and constitute a part of this application. The exemplary embodiments of this application and the description thereof are intended to explain this application but not to constitute any undue limitation on this application. In the drawings:

FIG. 23 is a schematic outside view of a vehicle according to some embodiments of this application;

FIG. 24 is a schematic flowchart of a method for manufacturing an electrode assembly according to some embodiments of this application.

DETAILED DESCRIPTION OF EMBODIMENTS

Figure 1:
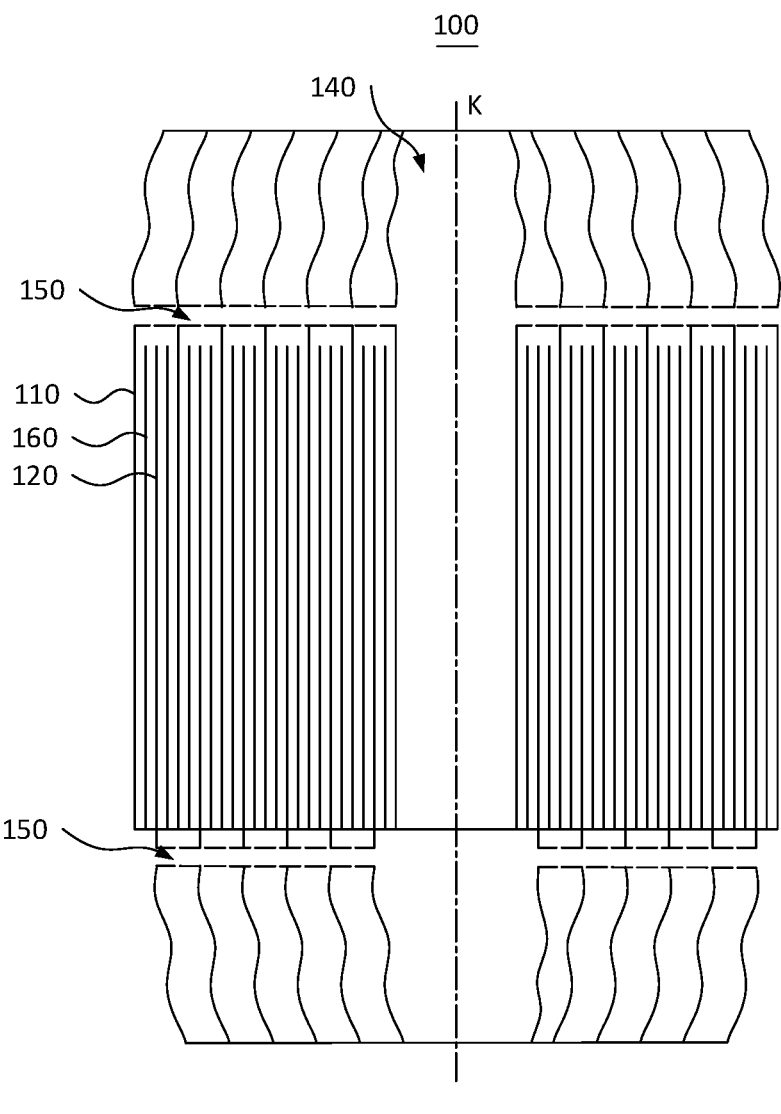
FIG. 1 is a schematic structural diagram of a longitudinal section of an electrode assembly sectioned along a winding axis K according to some embodiments of this application.

Reference Numerals electrode assembly 100, first electrode plate 110, second electrode plate 120, active material portion 131, tab portion 132, first tab portion 132a, second tab portion 132b, first hole 133, accommodation cavity 140, first accommodation cavity 141, second accommodation cavity 142, guide path 150, first guide path 151, second guide path 152, separator 160;

battery cell 200, shell 210, housing 211, opening 211a, end cap 212, injection hole 213;

battery 300, box 301;

vehicle 400, motor 401, controller 402;

device 600 for manufacturing an electrode assembly, electrode plate placing module 601, winding module 602.

To make the objectives, technical solutions, and advantages of the embodiments of this application clearer, the following gives a clear and complete description of the technical solutions in the embodiments of this application with reference to the drawings in the embodiments of this application. Apparently, the described embodiments are merely a part of but not all of the embodiments of this application. All other embodiments derived by a person of ordinary skill in the art based on the embodiments of this application without making any creative efforts fall within the protection scope of this application.

Unless otherwise defined, all technical and scientific terms used herein have the same meanings as usually understood by a person skilled in the technical field of this application. The terms used in the specification of this application are merely intended for describing specific embodiments but are not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings of this application are intended to distinguish different objects, but are not intended to describe a specific sequence or order of priority.

Reference to "embodiment" herein means that a specific feature, structure or characteristic described with reference to the embodiment may be included in at least one embodiment. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

The term "and/or" herein merely indicates a relationship between related objects, and represents three possible relationships. For example, "A and/or B" may represent the following three circumstances: A alone, both A and B, and B alone. In addition, the character "/" herein generally indicates an "or" relationship between the object preceding the character and the object following the character.

"A plurality of" referred to in this application means two or more (including two). Similarly, "a plurality of groups" means two or more groups (including two groups), and "a plurality of pieces" means two or more pieces (including two pieces).

Batteries mentioned in this field may be classed into a primary battery and a rechargeable battery depending on rechargeability. The primary battery (primary battery) is informally known as a "disposable" battery or a galvanic battery because the battery is not rechargeable and has to be discarded after consumption of electrical power. A rechargeable battery is also called a secondary battery (secondary battery), secondary cell, or storage battery. A material for and a process of manufacturing a rechargeable battery are different from those of a primary battery. An advantage of the rechargeable battery is that the battery can be used for a plurality of cycles after being charged. An output current load capacity of the rechargeable battery is higher than that of most primary batteries. Currently, common types of rechargeable batteries include: lead-acid battery, nickel-metal hydride battery, and lithium-ion battery. The lithium-ion battery exhibits advantages such as a light weight, a high capacity (the capacity is 1.5 to 2 times that of a nickel-metal hydride battery of the same weight), and no memory effect, and exhibits a very low self-discharge rate. Therefore, despite relative expensiveness, the lithium-ion battery is widely applied. The lithium-ion battery is also applied to pure electric vehicles and hybrid vehicles. The lithium-ion battery for use in such vehicles exhibits a relatively low capacity, but a relatively high output current and charge current and a relatively long life, but involves a relatively high cost.

The battery described in the embodiments of this application means a rechargeable battery. The following describes the conception of this application using a lithium-ion battery as an example. Understandably, this application is applicable to any other suitable types of rechargeable batteries. The battery mentioned in the embodiments of this application means a stand-alone physical module that includes one or more battery cells to provide a higher voltage and a higher capacity. For example, the battery mentioned in this application may include a battery module, a battery pack, or the like. A plurality of battery cells may be connected together in series and/or parallel through electrode terminals, so as to be applied in various scenarios. In some high-power application scenarios such as electric vehicles, the use of a battery covers three levels: a battery cell, a battery module, and a battery pack. The battery module is formed by electrically connecting a specific quantity of battery cells together and putting the battery cells into a frame, so as to protect the battery cells from external impact, heat, vibration, and the like. The battery pack is a final state of a battery system mounted in an electric vehicle. Currently, most of battery packs are made by assembling various control and protection systems such as a battery management system (battery management system, BMS) and a thermal management part on one or more battery modules. With advancement of technologies, the battery module is omissible. That is, a battery pack is directly formed from battery cells. This improvement decreases the quantity of parts significantly while enhancing a gravimetric energy density and a volumetric energy density of the battery system. A battery referred to in this application includes a battery module or a battery pack.

A battery cell is a basic structural unit of a battery module and a battery pack, and includes a housing and an electrode assembly accommodated in the housing. The housing is filled with an electrolytic solution. The electrode assembly mainly includes a positive electrode plate and a negative electrode plate that are stacked together. Generally, a separator is disposed between the positive electrode plate and the negative electrode plate. The parts, coated with an active material, of the positive electrode plate and the negative electrode plate, constitute a body region of the electrode assembly. The part, coated with no active material, of the positive electrode plate, constitutes a positive tab region; and the part, coated with no active material, of the negative electrode plate, constitutes a negative tab region. The positive electrode plate may be made of aluminum. A positive active material may be lithium cobalt oxide ($LiCoO_2$), lithium manganese oxide ($LiMn_2O_4$), lithium nickel oxide ($LiNiO_2$), lithium iron phosphate ($LiFePO_4$), or a ternary material such as lithium nickel cobalt manganese oxide ($LiNiMnCoO_2$, or NMC), or the like. The negative electrode plate may be made of copper. A negative active material may be carbon, silicon, or the like. The separator is typically made of a polyolefin material exemplified by polyethylene (PE) and polypropylene (PP). The positive tab region and the negative tab region may be located at one end of the body region together or at two ends of the body region separately.

Depending on the form of packaging, battery cells are generally classed into three types: cylindrical battery cell, prismatic battery cell, and pouch-type battery cell. The positive electrode plate, the separator, and the negative electrode plate are wound or stacked to form an electrode assembly of a desired shape. For example, the positive electrode plate, the separator, and negative electrode plate that are stacked in a cylindrical battery cell are wound into a cylinder-shaped electrode assembly. The positive electrode plate, the separator, and the negative electrode plate that are stacked in a prismatic battery cell are wound or stacked to form an electrode assembly in the shape of approximately a cuboid.

An electrolytic solution is a carrier of ion transport in a lithium-ion battery. In a charging or discharging process, lithium ions are transported between the positive electrode plate and the negative electrode plate through the electrolytic solution. To ensure the performance of the lithium-ion battery, the electrolytic solution needs to sufficiently infiltrate the positive active material and the negative active material in the electrode assembly of the lithium-ion battery when the electrolytic solution is initially injected and during subsequent cyclic charging and discharging processes. If the transmission rate of the electrolytic solution in the electrode assembly is slow or the electrolytic solution between the positive electrode plate and the negative electrode plate is insufficient, the amount of the active material participating in the charge and discharge reactions may decrease, thereby affecting battery performance. Therefore, infiltrating the positive active material and the negative active material sufficiently by the electrolytic solution is an important factor to ensure high performance of the battery.

During the research and development, the applicant finds that in the wound electrode assembly, the electrolytic solution is scarcely effective in infiltrating the active materials on the electrode plates. Especially, for some electrode assemblies that are relatively long in size, the problem of poor infiltration effects is more evident. After further research, the applicant finds that main reasons for the poor infiltration by the electrolytic solution in the electrode assembly are as follows:

(1) Most of the space in the housing is occupied by the electrode assembly and other mechanical parts, and the remaining space available for storing the electrolytic solution is relatively small, thereby decreasing the amount of electrolytic solution stored in the housing after the electrolytic solution is injected.

(2) Inside the electrode assembly, the electrolytic solution is usually transmitted only through the gap between the positive electrode plate and the negative electrode plate, and the transmission rate of the electrolytic solution is relatively slow. Consequently, the electrolytic solution is unable to sufficiently infiltrate the active material on the electrode plate in a short time, thereby affecting the battery performance. Especially, during charging and discharging, lithium ions intercalated into the electrode plate lead to change of lattice parameters of the electrode plate, and result in expansion of the electrode plate. The electrode plate expands and shrinks with the increase of the charge and discharge cycles. As the volume of the electrode plate expands, the gap between the positive electrode plate and the negative electrode plate becomes smaller, and the electrolytic solution is squeezed toward the outside of the electrode assembly. As the volume of the electrode plate shrinks, the gap between the positive electrode plate and the negative electrode plate is restored, and the electrolytic solution can flow back into the space between the positive electrode plate and the negative electrode plate from the outside of the electrode assembly. During the charging and discharging, the electrode assembly works like "breathing", and "inhales" and "exhales" the electrolytic solution repeatedly. In this process, because the negative pressure environment existent at the time of injecting the electrolytic solution does not exist in the housing, the electrolytic solution is transmitted by means of only the gap between the positive electrode plate and the negative electrode plate, thereby leading to a very slow transmission speed of the electrolytic solution, and affecting the battery performance.

Figure 2:
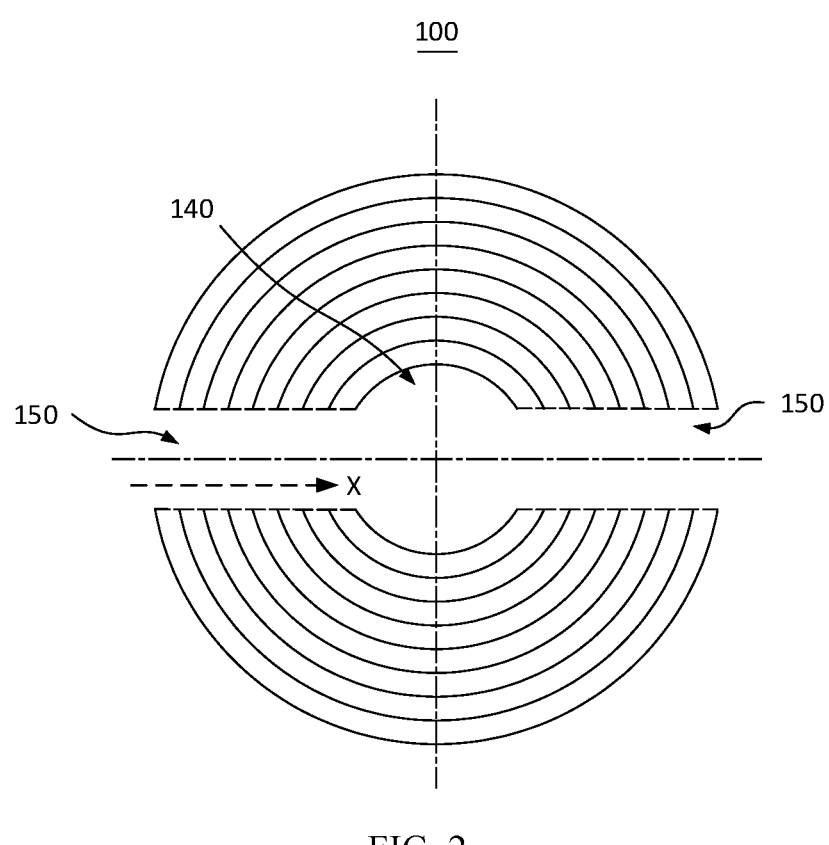
FIG. 2 is a schematic structural diagram of a cross section of an electrode assembly sectioned along a line perpendicular to a winding axis according to some embodiments of this application.

In view of the foregoing problem, some embodiments provide an electrode assembly. Referring to FIG. 1 and FIG. 2, the electrode assembly 100 includes at least two electrode plates, including a first electrode plate 110 and a second electrode plate 120 that are of opposite polarities. The first electrode plate 110 and the second electrode plate 120 are wound around a winding axis K to form a multilayer structure. The multilayer structure includes an accommodation cavity 140 extending along a direction of the winding axis K. The accommodation cavity 140 is configured to accommodate an electrolytic solution. The electrode assembly 100 further includes at least one guide path 150 extending along a first direction X. The first direction X is a direction perpendicular to the winding axis K. The guide path 150 is configured to guide the electrolytic solution out of the accommodation cavity 140.

With respect to the first electrode plate 110 and the second electrode plate 120, the first electrode plate 110 is a positive electrode plate, and the second electrode plate 120 is a negative electrode plate; or, the first electrode plate 110 is a negative electrode plate, and the second electrode plate 120 is a positive electrode plate.

The direction of the winding axis K may be parallel to the horizontal plane or perpendicular to the horizontal plane, depending on the arrangement of the battery cells. FIG. 1 shows only a longitudinal section of the electrode assembly 100 sectioned along the winding axis K. A battery cell that includes the electrode assembly 100 can be placed in the battery vertically and horizontally. When the battery cell is placed vertically, the direction of the winding axis K is perpendicular to the horizontal plane. When the battery cell is placed horizontally, the direction of the winding axis K is parallel to the horizontal plane.

The multilayer structure may be a flat multilayer structure or a cylindrical multilayer structure, including a plurality of layers of electrode plates. Each layer of electrode plate means a coil of electrode plate around the winding axis K. Two ends of each coil of electrode plate are not connected to each other, but are connected to two adjacent coils of electrode plates respectively.

The number of the guide paths 150 may be one or more. A relatively large number of the guide paths 150 can increase transmission paths of the electrolytic solution inside the electrode assembly 100. When a plurality of guide paths 150 are arranged, the plurality of guide paths 150 may be symmetrically arranged in a plane that includes a line of direction perpendicular to the winding axis K, where the symmetrical arrangement is symmetry with respect to a center point of the accommodation cavity 140 in the plane, thereby equalizing the infiltration effect of the electrolytic solution from the center of the electrode assembly 100 to the outside. Along the first direction X, the guide path 150 can run through all electrode plates, for example, run through all electrode plates on one side of the winding axis K, or run through all electrode plates on both sides of the winding axis K, or run through just a part of the electrode plates. In the longitudinal section shown in FIG. 1, the guide path 150 may be arranged at one or more of an upper end, a middle part, or a lower end of the electrode assembly 100.

That the first direction X is a direction perpendicular to the winding axis K falls in two circumstances. In a first circumstance, the first direction X is a direction perpendicular to the winding axis K and located in a plane that includes the winding axis K, where the central axis of the guide path 150 intersects the winding axis K. In a second circumstance, the first direction X is a direction perpendicular to the winding axis K and located in other planes such as a plane intersecting the winding axis K and a plane parallel to the winding axis K. where the central axis of the guide path 150 does not intersect the winding axis K.

The expelling to the outside means that the electrolytic solution flows from the accommodation cavity 140 to the first electrode plate 110 and the second electrode plate 120, so as to infiltrate the electrode plates.

In various embodiments, the guide path 150 is disposed as a transmission path of the electrolytic solution. In this way, the electrolytic solution in the accommodation cavity 140 can not only be expelled outward through the gap between the first electrode plate 110 and the second electrode plate 120, but also be expelled outward through the guide path 150, thereby increasing transmission paths of the electrolytic solution inside the electrode assembly 100, and improving the infiltration effect of the electrolytic solution in the electrode assembly 100. In addition, the guide path 150 helps to expel the gas generated inside the electrode assembly 100.

In some embodiments, as shown in FIG. 1, the central axis of the accommodation cavity 140 coincides with the winding axis K. In such embodiments, because the winding axis K is located at the center of the electrode assembly 100, the accommodation cavity 140 is also located at the center of the electrode assembly 100, thereby equalizing the infiltration effect of the electrolytic solution from the center of the electrode assembly 100 to the outer side. A person skilled in the art understands that, due to processing errors, the central axis of the accommodation cavity 140 may coincide with the winding axis K not exactly, but by deviating to a slight degree. To the extent permitted by the processing errors, even if the central axis of the accommodation cavity 140 deviates slightly from the winding axis K, it is still considered that the central axis of the accommodation cavity 140 coincides with the winding axis K.

The positive electrode plate is coated with a positive active material on a surface, and the negative electrode plate is coated with a negative active material on a surface. A region coated with an active material on the positive electrode plate is a positive active material region. A region coated with no active material on the positive electrode plate is a positive non-active material region. A region coated with an active material on the negative electrode plate is a negative active material region. A region coated with no active material on the negative electrode plate is a negative non-active material region.

Figure 3:
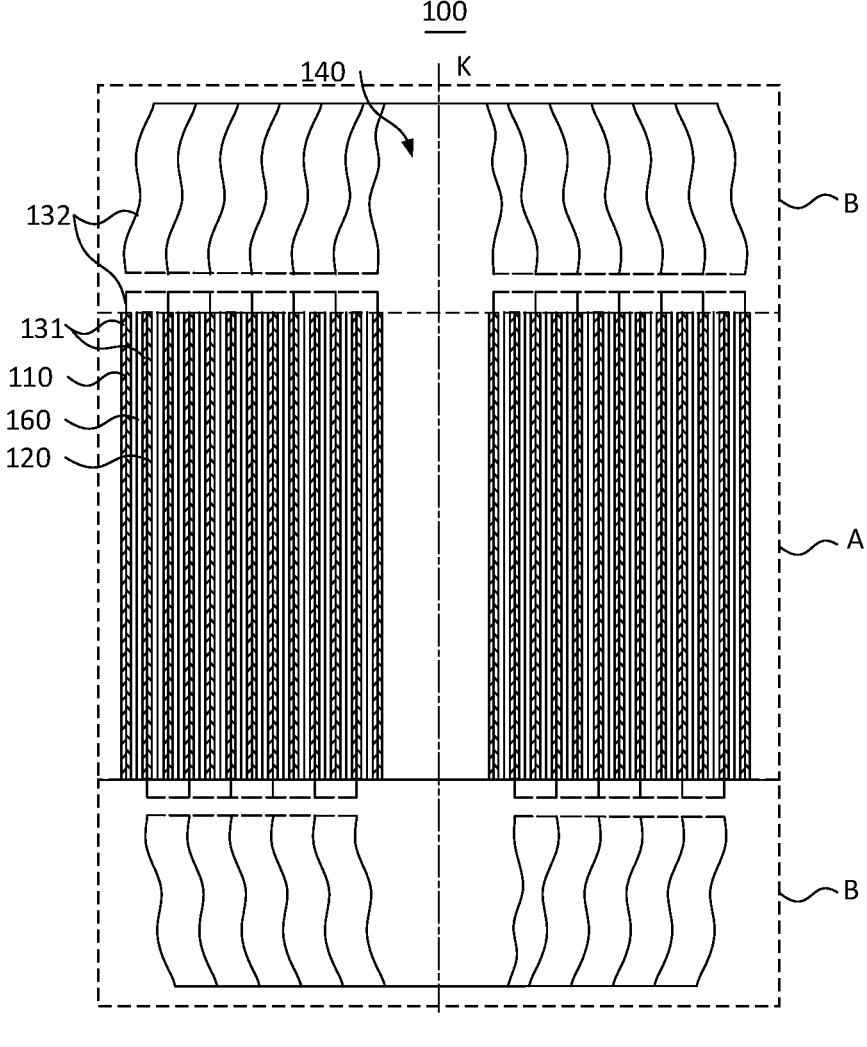
FIG. 3 is a schematic structural diagram of a longitudinal section of an electrode assembly sectioned along a winding axis K according to some embodiments of this application.

In some embodiments, referring to FIG. 3, the active material region of the first electrode plate 110 and the active material region of the second electrode plate 120 are wound to form a body region A. The body region A includes a plurality of stacked active material portions 131. The non-active material region of the first electrode plate 110 or a non-active material region of the second electrode plate 120 is wound to form a tab region B. The tab region B includes a plurality of stacked tab portions 132. The accommodation cavity 140 runs through the body region A and the tab region B along the direction of the winding axis K.

Each coil of the first electrode plate 110 around the winding axis K in the body region A or each coil of the second electrode plate 120 around the winding axis K in the body region A is an active material portion 131. Each coil of the first electrode plate 110 around the winding axis K in the tab region B or each coil of the second electrode plate 120 around the winding axis K in the tab region B is a tab portion 132. As mentioned above, the positive tab region and the negative tab region may be both located at one end of the body region A, or at two ends of the body region A respectively. That the accommodation cavity 140 runs through the body region A and the tab region B along the direction of the winding axis K means: when the positive tab region and the negative tab region are both located at one end of the body region A, the accommodation cavity 140 runs through the tab region B and the body region A in sequence; when the positive tab region and the negative tab region are located at the two ends of the body region A respectively, the accommodation cavity 140 runs through the tab region B and the body region A of the positive electrode as well as the tab region B of the negative electrode in sequence, as shown in FIG. 1.

In the electrode assembly arranged in this way, because the accommodation cavity 140 runs through the body region A and the tab region B along the direction of the winding axis K, the electrolytic solution in the accommodation cavity 140 can flow into the interior of the body region A through an end of the tab region B.

In some embodiments, referring to FIG. 2, the electrode assembly 100 is a cylindrical structure, and the first direction X is a radial direction of the cylindrical structure.

The radial direction of a cylindrical structure means a linear direction along a diameter or radius of a circle within a cross section of the cylindrical structure. When the central axis of the accommodation cavity 140 coincides with the winding axis K, the radial direction of the cylindrical structure means a direction from the outside of the electrode assembly 100 to the center of the accommodation cavity 140, or a direction from the center of the accommodation cavity 140 to the outside of the electrode assembly 100, within the cross section of the cylindrical structure.

In the cylinder-structured electrode assembly, the guide path 150 extends along the radial direction of the cylindrical structure to guide the electrolytic solution in the accommodation cavity 140 so that the electrolytic solution is transmitted outward along the radial direction. In this way, a relatively fast path is provided for transmitting the electrolytic solution, and the infiltration efficiency of the electrolytic solution in the electrode assembly 100 is improved.

The following describes in detail the position of the guide path 150 in the cross section of the electrode assembly 100, where the cross section is perpendicular to the winding axis.

Figure 4:
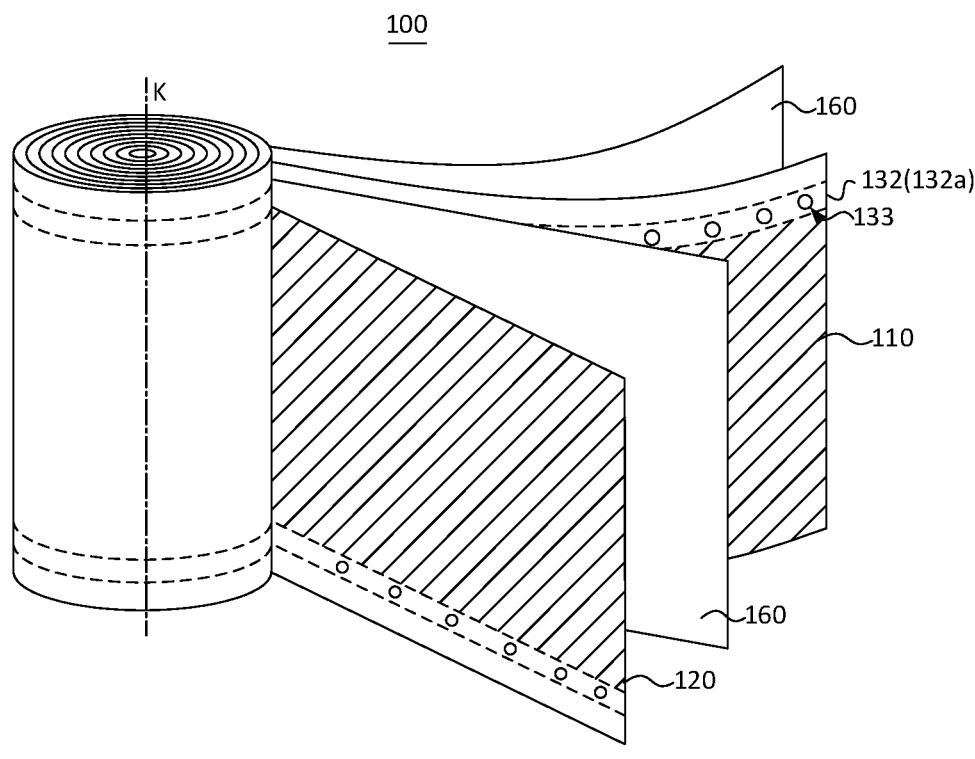
FIG. 4 is a three-dimensional schematic structural diagram of an electrode assembly according to some embodiments of this application.
Figure 5:
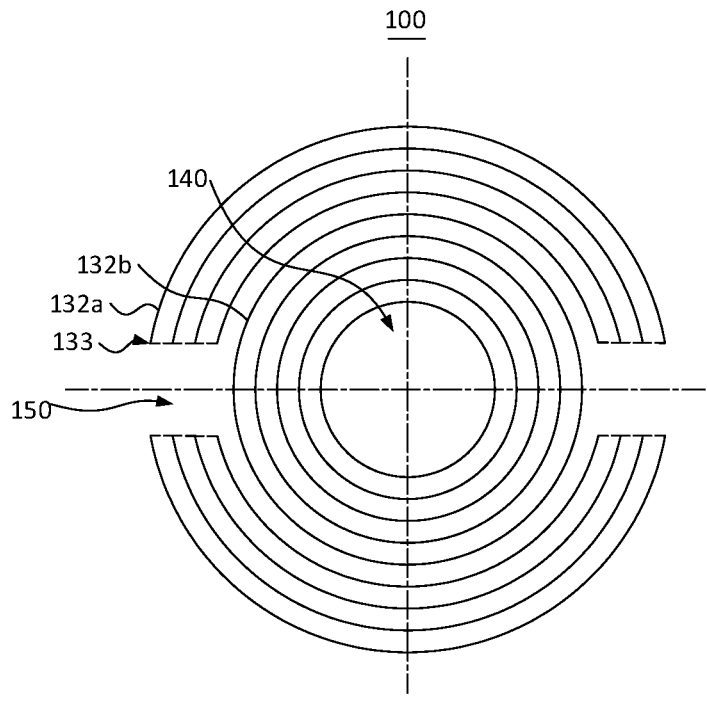
FIG. 5 is a schematic structural diagram of a cross section of an electrode assembly sectioned along a line perpendicular to a winding axis according to some embodiments of this application.

In some embodiments, referring FIG. 4 and FIG. 5, a plurality of tab portions 132 include a plurality of consecutively arranged first tab portions 132a. Each first tab portion 132a is provided with at least one first hole 133 that runs through along a thickness direction of the first tab portion. The first holes 133 of all the first tab portions 132a are configured to be arranged opposite to each other along the first direction X to form the guide path 150.

The plurality of consecutively arranged first tab portions 132a mean that all coils of first tab portions 132a are disposed adjacent to each other. For example, starting from the innermost side of the electrode assembly 100, all the $n^{th}$ to $(n+i)^{th}$ coils of tab portions are the first tab portions 132a.

On each coil of first tab portion 132a, the number of first holes 133 may be one or more.

That the first holes 133 of all the first tab portions 132a are disposed opposite to each other along the first direction X means that, in the first direction X, projections of any two first holes 133 overlap partly, so as to form the guide path 150 that runs through in the first direction X. For example, centers of all the first holes 133 are exactly aligned, or the centers of some of the first holes 133 are staggered. When the centers of all the first holes 133 are designed to be exactly aligned, due to processing errors, positions of the first holes 133 in the electrode assembly 100 may be deviated from each other. The exact alignment is achieved as long as projections of any two first holes 133 in the first direction X overlap partly.

The first holes 133 are made on all the consecutively arranged first tab portions 132a, and the first holes 133 are arranged opposite to each other along the first direction X to form the guide path 150. The guide path 150 formed in this way is a continuous through path, and can shorten the transmission path of the electrolytic solution. In this way, the electrolytic solution can flow into a space between two adjacent first tab portions 132a quickly through the guide path 150, and the electrolytic solution can flow into the interior of the body region A.

The first tab portions 132a may be arranged in various ways. The following describes the arrangement of the first tab portions 132a.

FIG. 2 to FIG. 4 show a scenario in which all coils of tab portions 132 in the electrode assembly 100 are first tab portions 132a. An outer end of the guide path 150 is in direct communication with an external space of the electrode assembly 100, and an inner end of the guide path 150 is in direct communication with the accommodation cavity 140. The electrolytic solution in the accommodation cavity 140 and the electrolytic solution in the external space of the electrode assembly 100 can flow directly into a space between two adjacent first tab portions 132a through the guide path 150, so as to flow into the interior of the body region.

In other embodiments, as shown in FIG. 5, an outermost tab portion in the tab region is the first tab portion 132a. An outer end of the guide path 150 is in direct communication with the external space of the electrode assembly 100.

The outermost tab portion in the tab region means an outermost coil of tab portions.

The outer end of the guide path 150 is an end that is of the guide path 150 and that is far away from the accommodation cavity 140 and close to the external space of the electrode assembly 100.

A guide path 150 with the outer end in direct communication with the external space of the electrode assembly 100 is formed by making the first hole 133 on the first tab portion 132a that is outermost. In this way, the electrolytic solution in the external space of the electrode assembly 100 can flow into the guide path 150 directly, the electrolytic solution can flow into a space between the two adjacent first tab portions 132a quickly through the guide path 150, and the electrolytic solution can flow into the interior of the body region.

In the embodiment shown in FIG. 5, a plurality of first tab portions 132a are included. In addition to the outermost first tab portion 132a in the tab region, several tab portions adjacent to the outermost first tab portions 132a are also the first tab portions 132a. The first holes 133 are made on such first tab portions 132a.

As shown in FIG. 5, the plurality of tab portions further include a plurality of consecutively arranged second tab portions 132b. The second tab portions 132b are not provided with the first hole 133. All the plurality of second tab portions 132b are located between the guide path 150 and the accommodation cavity 140. An inner end of the guide path 150 communicates to the accommodation cavity 140 through a gap between two adjacent second tab portions 132b.

The plurality of consecutively arranged second tab portions 132b mean that all coils of second tab portions 132b are disposed adjacent to each other. For example, starting from the innermost side of the electrode assembly 100, all the 1$^{st}$ to m$^{th}$ coils of tab portions are the second tab portions 132b.

The inner end of the guide path 150 is an end that is of the guide path 150 and that is close to the accommodation cavity 140 and away from the external space of the electrode assembly 100.

The accommodation cavity 140 is formed by coiling the innermost second tab portion 132b, and is provided with an opening. The opening communicates to a first gap. The first gap is a gap between the innermost coil of second tab portion 132b and a second tab portion 132b adjacent to the innermost coil of second tab portion 132b. That the inner end of the guide path 150 communicates to the accommodation cavity 140 through a gap between two adjacent second tab portions 132b means that the inner end of the guide path 150 communicates to the accommodation cavity 140 through at least the first gap. When the number of the second tab portions 132b is greater than two, the inner end of the guide path 150 communicates to the first gap through gaps between two adjacent second tab portions 132b in sequence, and finally communicates to the accommodation cavity 140.

In the electrode assembly 100 disposed in this way, the inner end of the guide path 150 communicates to the accommodation cavity 140 through the gaps between the two adjacent second tab portions 132b. In this way, the electrolytic solution in the accommodation cavity 140 can flow into the guide path 150 along the gaps between the two adjacent second tab portions 132b. In addition, the second tab portion 132b is located between the guide path 150 and the accommodation cavity 140, which is equivalent to that the second tab portion 132b is located at an inner side of the electrode assembly 100. Therefore, the area of each coil of second tab portion 132b is relatively small. If the first hole 133 is made on the second tab portion 132b, the strength of the second tab portion 132b will be affected. Relatively high strength of the second tab portion 132b is ensured by omitting the first hole 133 on the second tab portion 132b.

In the foregoing embodiment, infiltration paths of the electrolytic solution include the following types of paths:

1. The electrolytic solution in the external space of the electrode assembly 100 flows into a space between two adjacent first tab portions 132a through the guide path 150 in direct communication with the external space of the electrode assembly, so as to flow into the interior of the body region;

2. The electrolytic solution in the accommodation cavity 140 flows into the gap between the innermost coil of second tab portion 132b and the second tab portion 132b adjacent to the innermost coil of second tab portion 132b, and flows through gaps between two adjacent second tab portions 132b in sequence, so as to flow into the interior of the body region. Such part of electrolytic solution can also flow into the guide path 150 through the gaps between the two adjacent second tab portions 132b that communicate to the inner end of the guide path 150, and then flow into the space between the two adjacent first tab portions 132a, so as to flow into the interior of the body region; and 3. The electrolytic solution at the end of the tab region and/or the body region flows into the space between two adjacent electrode plates through the gap between the ends of the electrode plates, so as to flow into the interior of the body region.

Figures 6, 7:
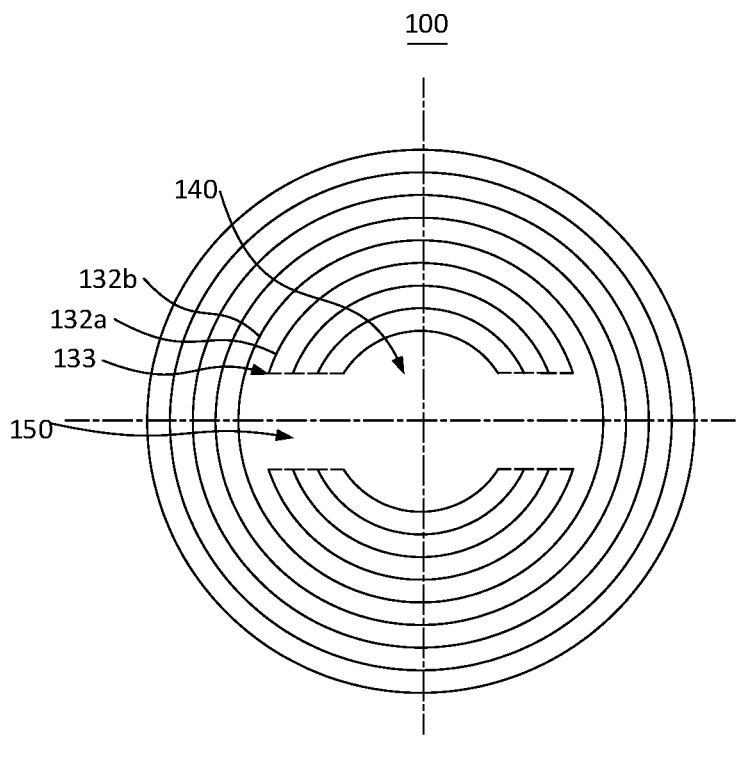
FIG. 6 is a schematic structural diagram of a cross section of an electrode assembly sectioned along a line perpendicular to a winding axis according to some embodiments of this application.
FIG. 7 is a schematic structural diagram of a cross section of an electrode assembly sectioned along a line perpendicular to a winding axis according to some embodiments of this application.

In some embodiments, as shown in FIG. 6, an innermost tab portion in the tab region is the first tab portion 132a. An inner end of the guide path 150 is in direct communication with the accommodation cavity 140.

The innermost tab portion in the tab region means an innermost coil of tab portions.

A guide path 150 with the inner end in direct communication with the accommodation cavity 140 is formed by making the first hole 133 on the first tab portion 132a that is innermost. In this way, the electrolytic solution in the accommodation cavity 140 can flow into the guide path 150 directly, the electrolytic solution can flow into a space between the two adjacent first tab portions 132a quickly through the guide path 150, and the electrolytic solution can flow into the interior of the body region.

Similar to what is described above, in this embodiment, as shown in FIG. 6, the plurality of tab portions further include a plurality of consecutively arranged second tab portions 132b. The second tab portions 132b are not provided with the first hole 133. All the plurality of second tab portions 132b are located between the external space of the electrode assembly 100 and the guide path 150. An outer end of the guide path 150 communicates to the external space of the electrode assembly 100 through a gap between two adjacent second tab portions 132b.

In the foregoing embodiment, infiltration paths of the electrolytic solution include the following types of paths:

1. The electrolytic solution in the accommodation cavity 140 flows into a space between two adjacent first tab portions 132a through the guide path 150 in direct communication to the accommodation cavity, so as to flow into the interior of the body region;

2. The electrolytic solution in the external space of the electrode assembly 100 flows into a second gap. The second gap is a gap between the outermost coil of second tab portion 132b and the second tab portion 132b adjacent to the outermost coil of second tab portion 132b. Further, the electrolytic solution flows through gaps between two adjacent second tab portions 132b in sequence, so as to flow into the interior of the body region. Such part of electrolytic solution can also flow into the guide path 150 through the gaps between the two adjacent second tab portions 132b that communicate to the outer end of the guide path 150, and then flow into the space between the two adjacent first tab portions 132a, so as to flow into the interior of the body region; and 3. The electrolytic solution at the end of the tab region and/or the body region flows into the space between two adjacent electrode plates through the gap between the ends of the electrode plates, so as to flow into the interior of the body region.

A person skilled in the art understands that, in some embodiments, the technical solutions according to the foregoing two embodiments may be combined. As shown in FIG. 7, the first tab portion 132a includes both the outermost tab portion and the innermost tab portion. Correspondingly, the guide path includes a first guide path 151 and a second guide path 152. The outer end of the first guide path 151 is in direct communication with the external space of the electrode assembly 100. The inner end of the second guide path 152 is in direct communication with the accommodation cavity 140. In this way, the electrolytic solution in the external space of the electrode assembly 100 can flow into the interior of the body region through the first guide path 151 in direct communication with the external space of the electrode assembly. In addition, the electrolytic solution in the accommodation cavity 140 can flow into the interior of the body portion through the second guide path 152 in direct communication with the accommodation cavity.

Figure 8:
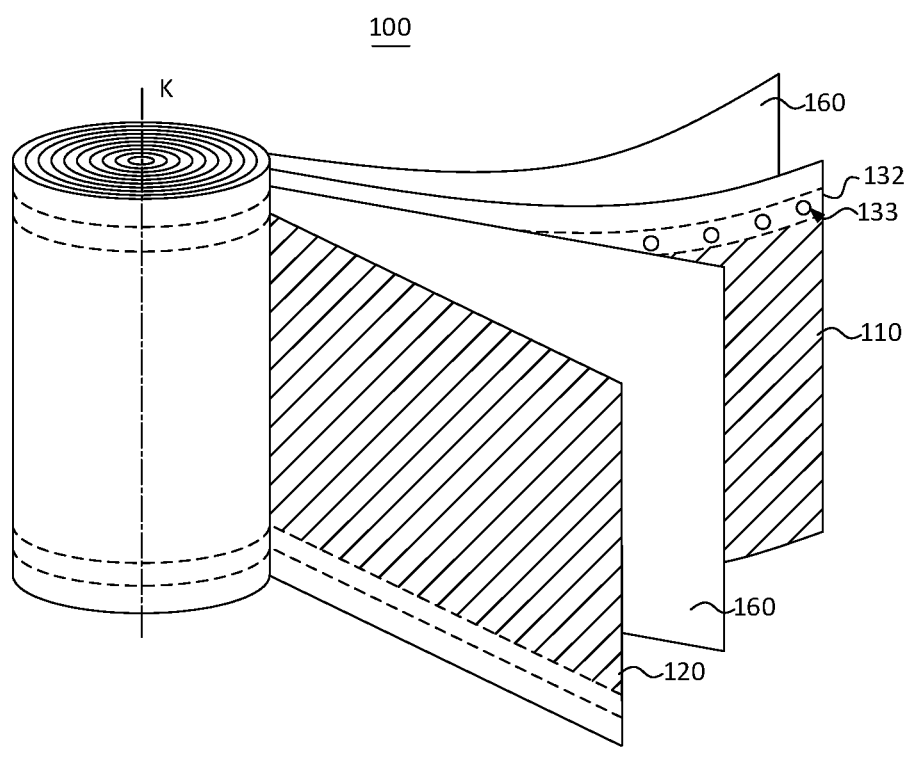
FIG. 8 is a three-dimensional schematic structural diagram of an electrode assembly according to some embodiments of this application.
Figure 9:
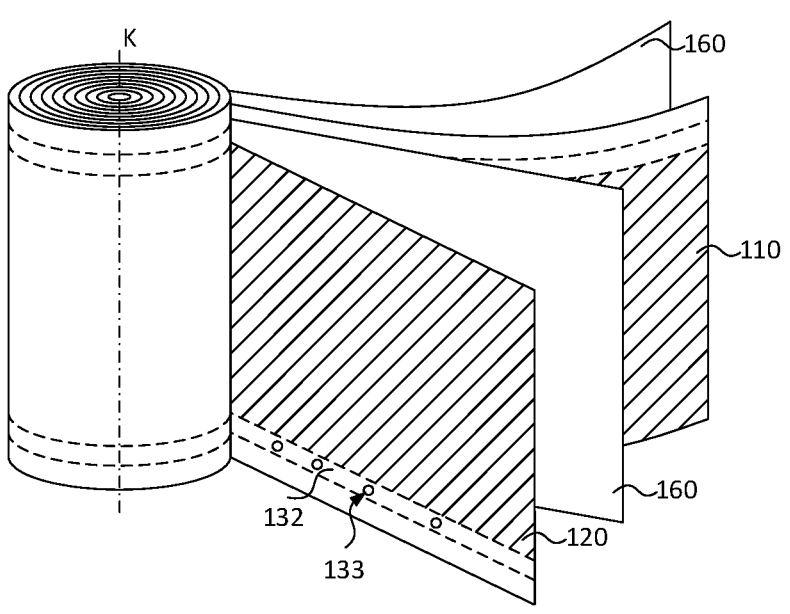
FIG. 9 is a three-dimensional schematic structural diagram of an electrode assembly according to some embodiments of this application.

Referring to FIG. 8, in some embodiments, the first tab portion may be disposed on the tab portion at only one end of the electrode assembly 100, for example, on the tab portion of only the first electrode plate 110. In this case, the first hole 133 is made on the tab portion 132 of only the first electrode plate 110 to form the guide path. Referring to FIG. 9, alternatively, the first tab portion may be disposed on the tab portion of only the second electrode plate 120. In this case, the first hole 133 is made on the tab portion 132 of only the second electrode plate 120 to form the guide path. In other embodiments, referring to FIG. 4, the first hole 133 may be made on the tab portions 132 at both ends of the electrode assembly 100. In this way, a guide path is formed at both ends of the electrode assembly 100, and more paths are available for transmitting the electrolytic solution inside the electrode assembly.

The following describes in detail the aperture arrangement of the first holes 133 in the guide path 150.

Figure 10:
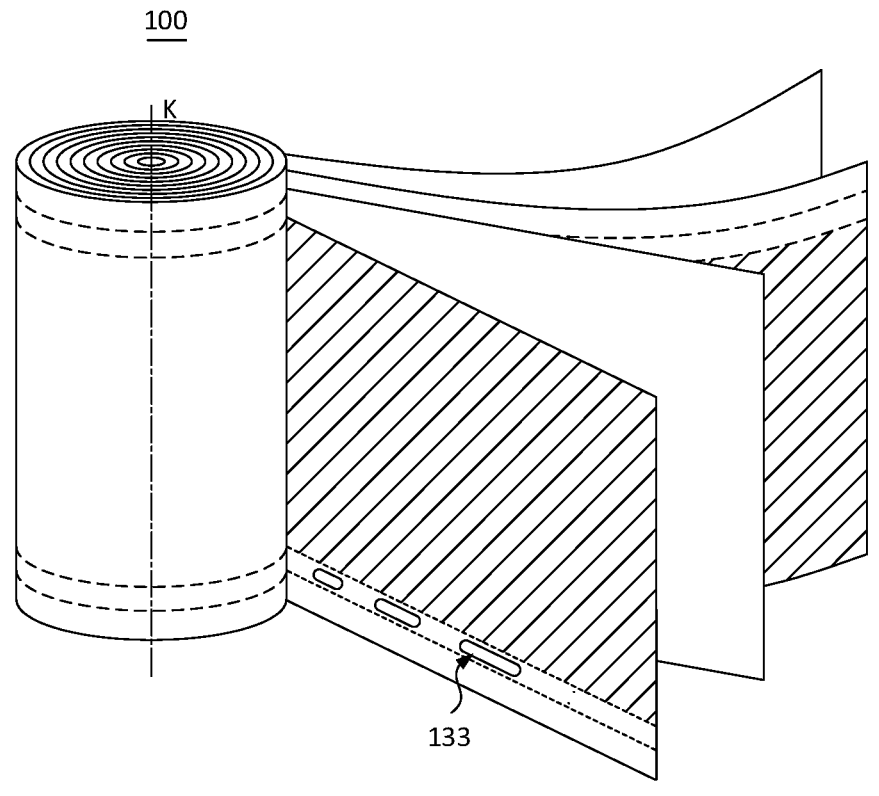
FIG. 10 is a three-dimensional schematic structural diagram of an electrode assembly according to some embodiments of this application.
Figure 11:
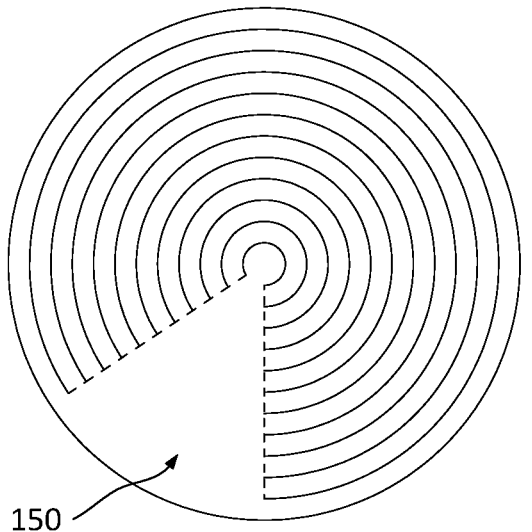
FIG. 11 is a schematic structural diagram of a cross section of the electrode assembly shown in FIG. 10 and sectioned along a line perpendicular to a winding axis.

In some embodiments, as shown in FIG. 10, in a direction from outside to inside of the electrode assembly 100, apertures of the plurality of first holes 133 decrease progressively to form a guide path 150, of which a cross section perpendicular to the winding axis K is approximately sectoral, as shown in FIG. 11.

The shape of the first hole 133 may be a circle, an ellipse, a polygon (such as a square, a rectangle, or a trapezoid), or the like, as long as the shape can be processed conveniently in practical applications. The aperture of the first hole 133 means the length of the first hole 133 on a horizontal plane that includes a center point of the first hole 133 when the electrode assembly 100 is placed vertically. For example, the aperture is equal to a diameter of the circle, a side length of the square, and the long side of the rectangle, or the like.

In this embodiment, in a direction from the outer coil of the wound electrode assembly 100 to the inner coil, the aperture of the first hole 133 on each coil of tab portion 132 is less than the aperture of the first hole 133 on a coil of tab portion 132 located outside said coil. A plurality of first holes 133 located on the same coil of tab portion 132 may have the same aperture or different apertures. The area of each coil of active material portion located at the outer side of the electrode assembly 100 is larger than the area of each coil of active material portion located at the inner side of the electrode assembly 100. Therefore, the former requires a larger amount of electrolytic solution. In a direction from outside to inside of the electrode assembly 100, the apertures of the plurality of first holes 133 are set to decrease progressively. In this way, the guide path 150 located at the outer side of the electrode assembly 100 is relatively large, and therefore, can meet the relatively great demand for the electrolytic solution for the active material portion located at the outer side of the electrode assembly 100.

In some embodiments, referring back to FIG. 4, in a direction from outside to inside of the electrode assembly 100, the apertures of the plurality of first holes 133 are identical, so as to form a guide path 150, of which a cross section perpendicular to the winding axis K is approximately rectangular, as shown in FIG. 2. In such an implementation, in a direction from outside to inside of the electrode assembly 100, the apertures of a plurality of first holes 133 are set to be identical. The first holes 133 of only one size need to be designed and processed, thereby reducing difficulty and cost of production.

Figure 12:
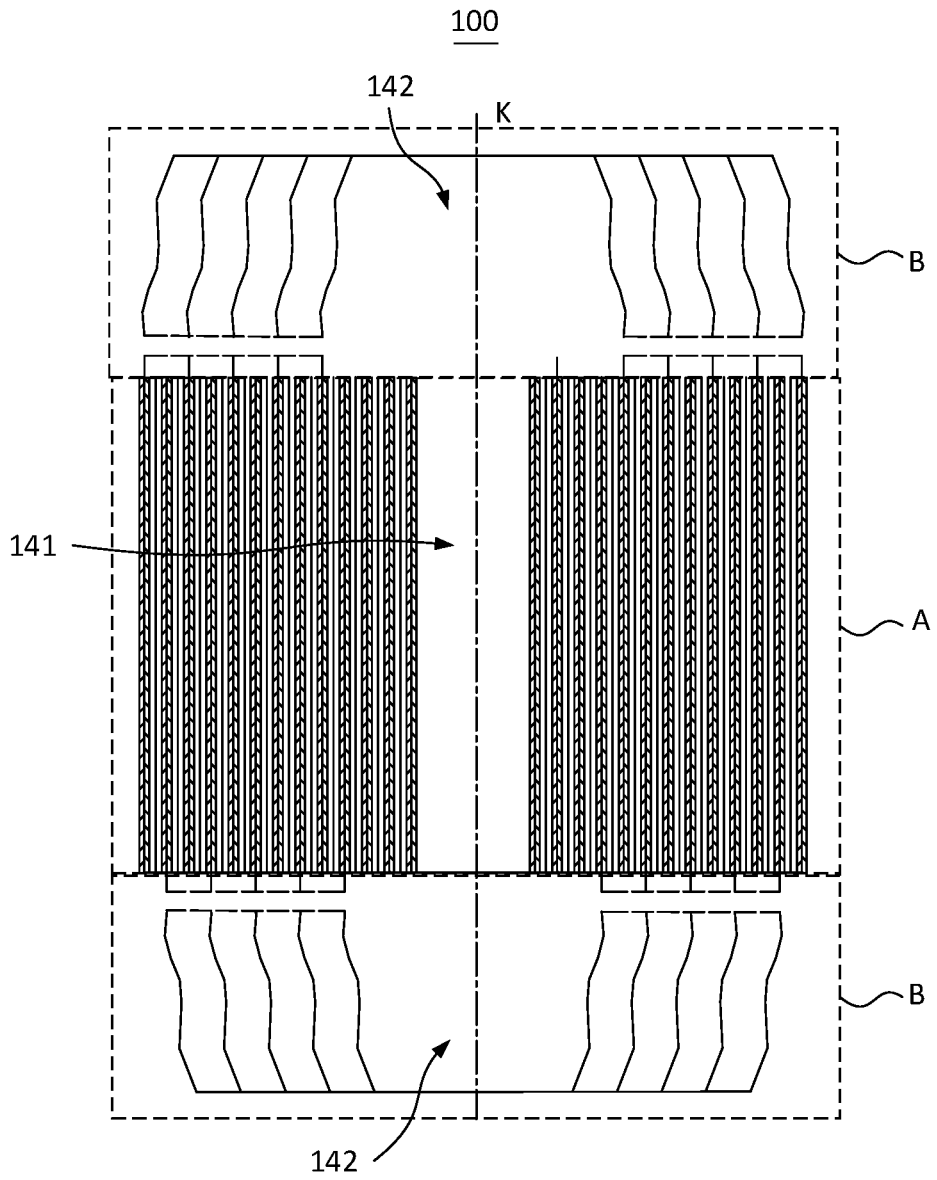
FIG. 12 is a schematic structural diagram of a longitudinal section of an electrode assembly sectioned along a winding axis K according to some embodiments of this application.

In some embodiments, as shown in FIG. 12, the accommodation cavity includes a first accommodation cavity 141 located in the body region A and a second accommodation cavity 142 located in the tab region B. Along a direction perpendicular to the winding axis K, a size of the second accommodation cavity 142 is larger than a size of the first accommodation cavity 141.

Figure 13:
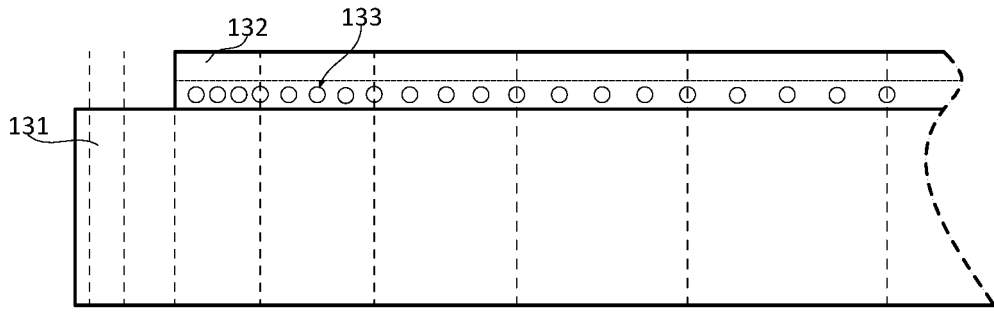
FIG. 13 is a schematic structural diagram of a part of an electrode plate of an electrode assembly in an unfolded state according to some embodiments of this application.

The accommodation cavity may be formed by the following method: as shown in FIG. 13, before the electrode plate is wound, a part of the tab is die-cut in advance. The die-cut part of the tab constitutes several coils of tab portions 132 located at the inner side of the electrode assembly 100 after winding. After the electrode plate is wound, a first accommodation cavity 141 is formed around the winding axis K in the body region A, and a second accommodation cavity 142 is formed around the winding axis K in the tab region B. The second accommodation cavity 142 includes a first part and a second part. The first part corresponds to the position of the first accommodation cavity 141 in the direction of the winding axis K, and possesses the same aperture. The second part is formed by die-cutting the tab.

The second accommodation cavity 142 of a relatively large size is provided in the tab region B that includes the guide path 150. The second accommodation cavity 142 can store a relatively large amount of electrolytic solution. The electrolytic solution can flow into the guide path 150 from the second accommodation cavity 142, thereby not only shortening the transmission path of the electrolytic solution, but also making a relatively large amount of electrolytic solution flow into the guide path 150, and further increasing the infiltration speed of the electrolytic solution. From a perspective of processing technology, the lengths of several coils of tab portions 132 located at the inner side of the electrode assembly 100 are relatively small in a direction around the winding axis K, and it is difficult make holes in such tab portions. Therefore, in this embodiment, the tab is die-cut, without a need to make the first hole on the several coils of tab portions 132 located at the inner side, thereby reducing the difficulty and cost of production.

Figure 14:
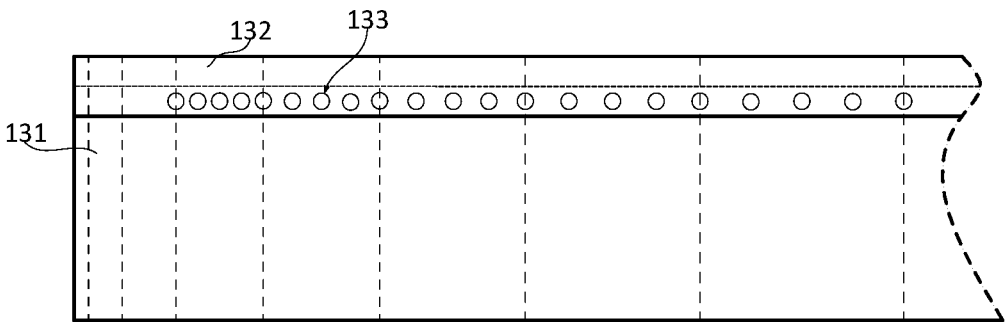
FIG. 14 is a schematic structural diagram of a part of an electrode plate of an electrode assembly in an unfolded state according to some embodiments of this application.
Figure 15:
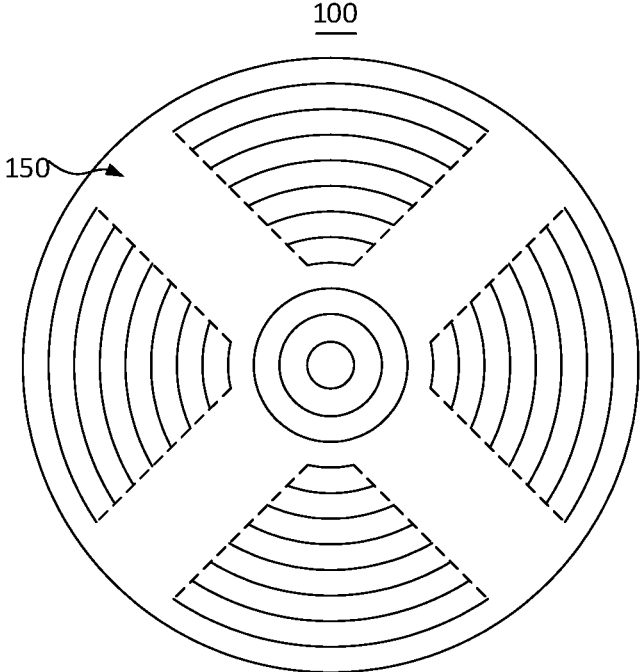
FIG. 15 is a schematic structural diagram of a cross section of the electrode assembly shown in FIG. 14 and sectioned along a line perpendicular to a winding axis.

In other embodiments, as shown in FIG. 14, the first hole 133 may be omitted on several tab portions 132 at the inner side of the electrode assembly 100, so as to form a guide path 150 shown in FIG. 15. With the first hole omitted on several coils of tab portions 132 at the inner side, the difficulty and cost of production are reduced, and relatively high strength of the plurality of tab portions 132 at the inner side of the electrode assembly 100 is ensured.

Figure 16:
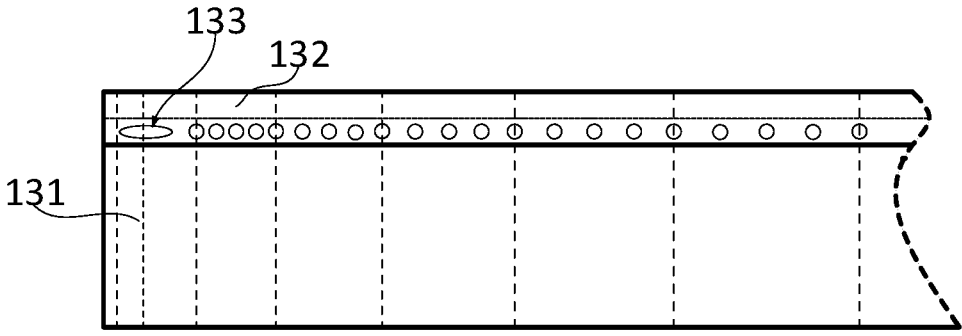
FIG. 16 is a schematic structural diagram of a part of an electrode plate of an electrode assembly in an unfolded state according to some embodiments of this application.
Figure 17:
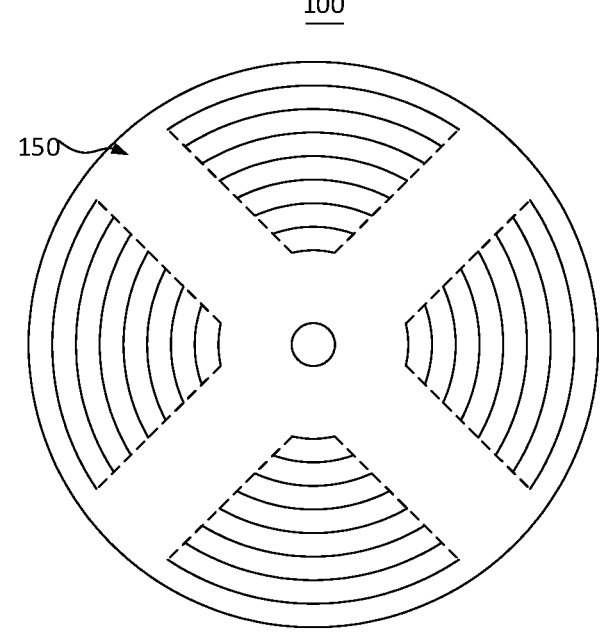
FIG. 17 is a schematic structural diagram of a cross section of the electrode assembly shown in FIG. 16 and sectioned along a line perpendicular to a winding axis.

In other embodiments, as shown in FIG. 16, a first hole 133 with a relatively large aperture is made on a combination of several tab portions 132 at the inner side, so as to form a guide path 150 shown in FIG. 17. The first hole is not made on a single tab portion 132 at the inner side, but a first hole 133 with a relatively large aperture is made on a combination of several tab portions 132 that are relatively short in the direction around the winding axis K, thereby ensuring good infiltration effects of the electrolytic solution and reducing the difficulty and cost of production.

Figure 18:
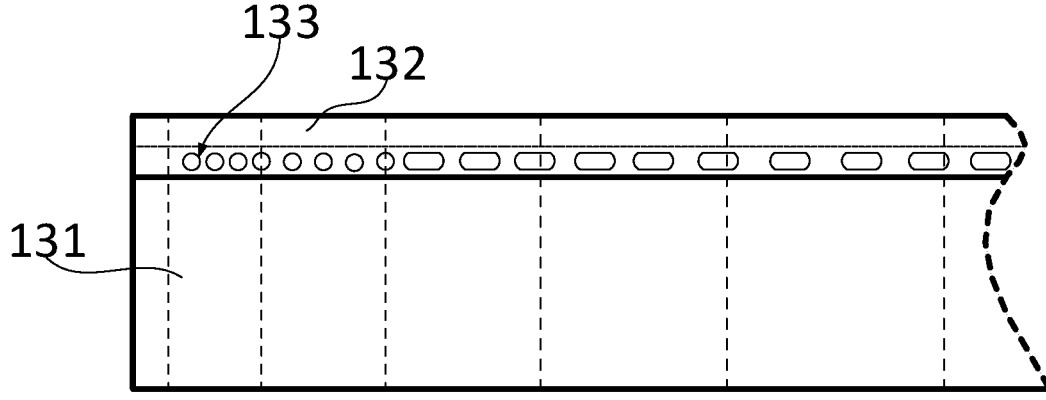
FIG. 18 is a schematic structural diagram of a part of an electrode plate of an electrode assembly in an unfolded state according to some embodiments of this application.
Figure 19:
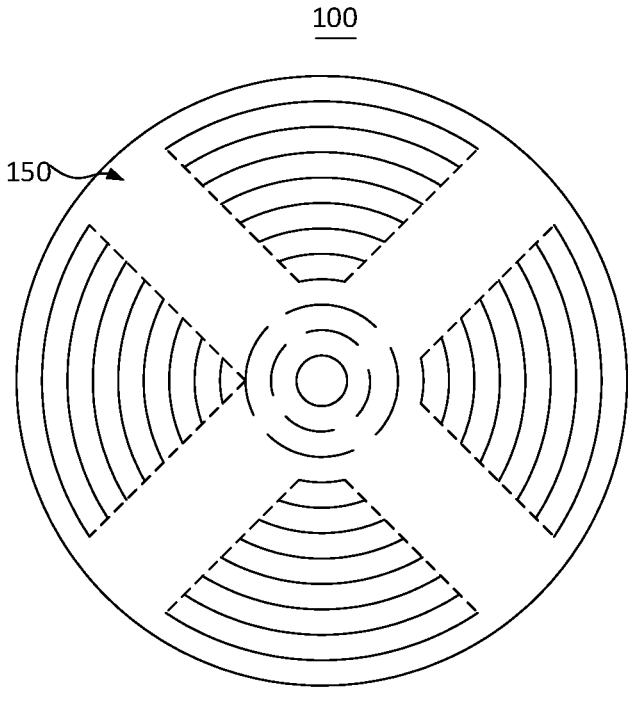
FIG. 19 is a schematic structural diagram of a cross section of the electrode assembly shown in FIG. 18 and sectioned along a line perpendicular to a winding axis.

In other embodiments, as shown in FIG. 18, a first hole 133 with a relatively small aperture is made on several tab portions 132 at the inner side, and a first hole 133 with a relatively large aperture is made on the tab portion 132 at the outer side, so as to form a guide path 150 shown in FIG. 19. The first hole 133 with a relatively small aperture is made on each tab portion 132 among several tab portions 132 at the inner side in the electrode assembly 100. In contrast to the first hole 133 with a relatively large aperture, the first holes with relatively small apertures not only ensure good infiltration effects of the electrolytic solution, but also reduce difficulty and cost of production, and ensure relatively high strength of the several tab portions 132 at the inner side of the electrode assembly 100.

Figure 20:
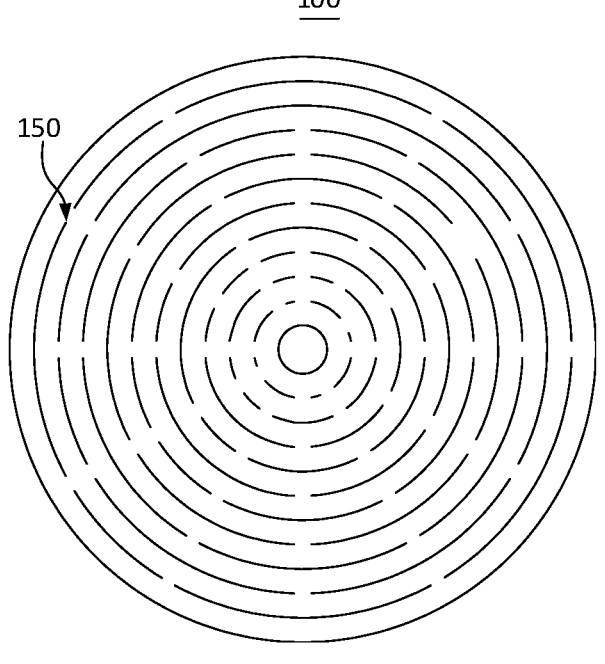
FIG. 20 is a schematic structural diagram of a cross section of an electrode assembly sectioned along a line perpendicular to a winding axis according to some embodiments of this application.

In some embodiments, to facilitate processing, irregular first holes 133 may be made on the tab portions 132. The apertures of the first holes 133 and/or distances between adjacent holes are randomly arranged, so that the guide paths 150 take on irregular shapes similar to the shapes shown in FIG. 20. The guide paths 150 communicate to each other tortuously. This method can reduce difficulty and cost of production.

Understandably, in some embodiments, a second hole may be made in the body region additionally to form a second guide path that is similar to the guide path in the foregoing embodiment in terms of structure, location, and functions. Definitely, it is appropriate to only make the first hole in the tab region, or only make the second hole in the body region, or make the first hole in the tab region and make the second hole in the body region concurrently.

Figure 21:
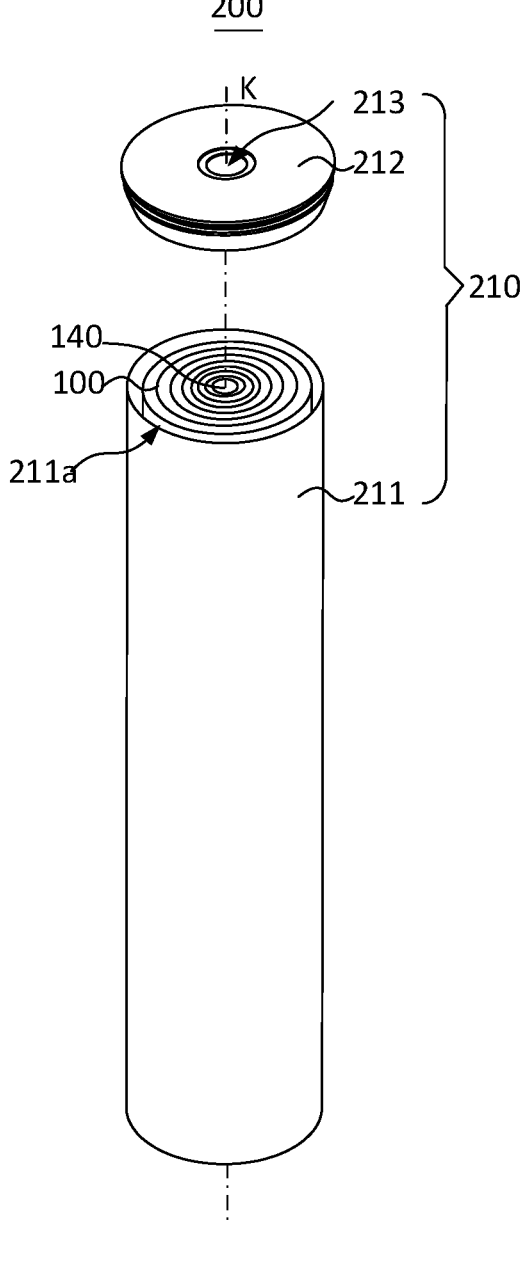
FIG. 21 is an exploded view of a battery cell according to some embodiments of this application.

An embodiment further provides a battery cell. As shown in FIG. 21, the battery cell 200 includes: a housing 211, an end cap 212, and the electrode assembly 100 described in the foregoing embodiment. An opening 211a is made at an end of the housing 211 along the direction of the winding axis K. The end cap 212 is configured to close the opening 211a. The electrode assembly 100 is disposed in the housing 211.

In the electrode assembly 100 of the battery cell 200, the guide path is disposed as a transmission path of the electrolytic solution. Therefore, the electrolytic solution in the accommodation cavity 140 can not only be expelled outward through a gap between the first electrode plate and the second electrode plate, but also be expelled outward through the guide path, thereby increasing transmission paths of the electrolytic solution inside the electrode assembly 100, and improving the infiltration effect of the electrolytic solution in the electrode assembly 100.

In some embodiments, an injection hole 213 is made on the end cap 212. The injection hole 213 is disposed opposite to the accommodation cavity 140 along the direction of the winding axis, so that the electrolytic solution can enter the accommodation cavity 140 through the injection hole 213. That the injection hole 213 is disposed opposite to the accommodation cavity 140 along the direction of the winding axis means that, in the direction of the winding axis, the projection of the injection hole 213 partly overlaps the projection of the accommodation cavity 140, and at least a part of the injection hole 213 is in direct communication with the accommodation cavity 140 in the direction of the winding axis.

With the injection hole 213 disposed opposite to the accommodation cavity 140 along the direction of the winding axis, the electrolytic solution can directly flow into the accommodation cavity 140 after being injected from the injection hole 213, thereby increasing the transmission speed of the electrolytic solution.

Figure 22:
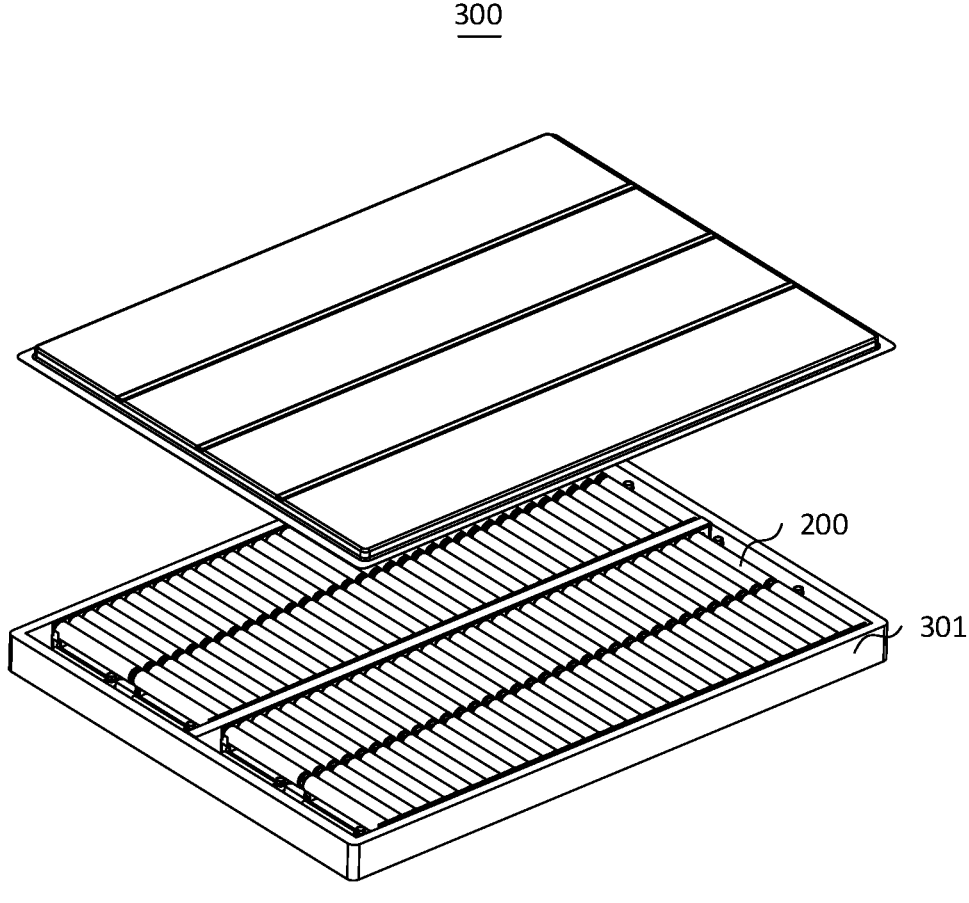
FIG. 22 is an exploded view of a battery according to some embodiments of this application.

An embodiment further provides a battery. As shown in FIG. 22, the battery 300 includes the battery cell 200 described in the foregoing embodiment. In some embodiments, the battery 300 generally further includes a box 301. The battery cell 200 is disposed in the box 301. In the battery 300, the guide path is disposed in the electrode assembly as a transmission path of the electrolytic solution. Therefore, the electrolytic solution in the accommodation cavity can not only be expelled outward through a gap between the first electrode plate and the second electrode plate, but also be expelled outward through the guide path, thereby increasing transmission paths of the electrolytic solution inside the electrode assembly, and improving the infiltration effect of the electrolytic solution in the electrode assembly.

An embodiment further provides an electrical device, including the battery described in the foregoing embodiment. The battery is configured to provide electrical energy. In the battery of the electrical device, the guide path is disposed in the electrode assembly as a transmission path of the electrolytic solution. Therefore, the electrolytic solution in the accommodation cavity can not only be expelled outward through a gap between the first electrode plate and the second electrode plate, but also be expelled outward through the guide path, thereby increasing transmission paths of the electrolytic solution inside the electrode assembly, and improving the infiltration effect of the electrolytic solution in the electrode assembly.

Understandably, the electrical device according this embodiment may be one of various electrical devices that use a battery, for example, a mobile phone, a portable device, a notebook computer, various vehicles (such as an electric power cart and an electric vehicle), a ship, a spacecraft, an electric toy, an electric tool. For example, the spacecraft includes an airplane, a rocket, a space shuttle, a spaceship, and the like. The electric toy includes a fixed or mobile electric toy, such as a game console, an electric car toy, an electric ship toy, an electric airplane toy, and the like. The electric tool includes an electric tool for metal cutting, an electric grinding tool, an electric assembly tool, an electric tool for railways, such as an electric drill, an electric grinder, an electric wrench, an electric screwdriver, an electric hammer, an electric impact drill, a concrete vibrator, and an electric planer. The battery described in this embodiment is not only applicable to the devices described above, but also applicable to all devices that use a battery. For brevity, the following embodiment is described by using a vehicle as an example.

For example, refer to FIG. 23, which is a brief schematic view of a vehicle 400 according to an embodiment. The vehicle 400 may be an oil-fueled vehicle, a natural gas vehicle, or a new energy vehicle. The new energy vehicle may be a battery electric vehicle, a hybrid electric vehicle, a range-extended electric vehicle, or the like. As shown in FIG. 23, the battery 300 may be disposed inside the vehicle 400. For example, the battery 300 may be disposed at the bottom, front, or rear of the vehicle 400. The battery 300 may be configured to supply power to the vehicle 400. For example, the battery 300 may serve as an operating power supply of the vehicle 400. In addition, the vehicle 400 may further include a controller 402 and a motor 401. The controller 402 is configured to control the battery 300 to supply power to the motor 401, for example, to start or navigate the vehicle 400, or meet the operating power requirements of the vehicle in operation. In another embodiment, the battery 300 serves not only as an operating power supply of the vehicle 400, but may also serve as a drive power supply of the vehicle 400 to provide driving motive power for the vehicle 400 in place of or partially in place of oil or natural gas. The battery 300 referred to hereinafter may also be understood as a battery pack that includes a plurality of battery cells. In the battery 300 of the vehicle 400, the guide path is disposed in the electrode assembly as a transmission path of the electrolytic solution. Therefore, the electrolytic solution in the accommodation cavity can not only be expelled outward through a gap between the first electrode plate and the second electrode plate, but also be expelled outward through the guide path, thereby increasing transmission paths of the electrolytic solution inside the electrode assembly, and improving the infiltration effect of the electrolytic solution in the electrode assembly.

The electrode assembly, battery cell, battery, and electrical device according to embodiments of this application have been described above with reference to FIG. 1 to FIG. 23. The following describes a method and device for manufacturing an electrode assembly according to embodiments of this application with reference to FIG. 24 and FIG. 25. For information not detailed in an embodiment, refer to the preceding embodiments.

Specifically, FIG. 24 is a schematic flowchart of a method 500 for manufacturing an electrode assembly according to an embodiment. As shown in FIG. 24, a method 500 for manufacturing an electrode assembly includes the following steps:

501: Provide at least two electrode plates, including a first electrode plate and a second electrode plate that are of opposite polarities; and

502: Wind the first electrode plate and the second electrode plate around a winding axis to form a multilayer structure, where the multilayer structure includes an accommodation cavity extending along a direction of the winding axis, the accommodation cavity is configured to accommodate an electrolytic solution, at least one guide path extending along a first direction is formed in the electrode assembly after the winding, the first direction is a direction perpendicular to the winding axis, and the guide path is configured to guide the electrolytic solution out of the accommodation cavity.

In a process of manufacturing an electrode assembly according to this embodiment, the guide path is disposed as a transmission path of the electrolytic solution. Therefore, the electrolytic solution in the accommodation cavity can not only be expelled outward through a gap between the first electrode plate and the second electrode plate, but also be expelled outward through the guide path, thereby increasing transmission paths of the electrolytic solution inside the electrode assembly, and improving the infiltration effect of the electrolytic solution in the electrode assembly.

Figure 25:
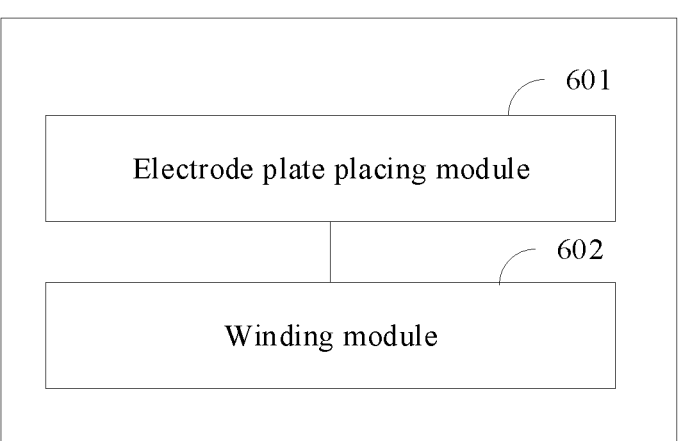
FIG. 25 is a schematic structural diagram of a device for manufacturing an electrode assembly according to some embodiments of this application.

FIG. 25 is a schematic block diagram of a device 600 for manufacturing an electrode assembly according to an embodiment. As shown in FIG. 25, the device 600 according to some embodiments of this application includes: an electrode plate placing module 601, configured to provide at least two electrode plates, including a first electrode plate and a second electrode plate that are of opposite polarities; and a winding module 602, configured to: wind the first electrode plate and the second electrode plate around a winding axis to form a multilayer structure. The multilayer structure includes an accommodation cavity extending along a direction of the winding axis. The accommodation cavity is configured to accommodate an electrolytic solution. At least one guide path extending along a first direction is formed in the electrode assembly after the winding. The first direction is a direction perpendicular to the winding axis. The guide path is configured to guide the electrolytic solution out of the accommodation cavity.

In a process of manufacturing an electrode assembly by using the device for manufacturing an electrode assembly according to this embodiment, the guide path is disposed as a transmission path of the electrolytic solution. Therefore, the electrolytic solution in the accommodation cavity can not only be expelled outward through a gap between the first electrode plate and the second electrode plate, but also be expelled outward through the guide path, thereby increasing transmission paths of the electrolytic solution inside the electrode assembly, and improving the infiltration effect of the electrolytic solution in the electrode assembly.

Finally, it needs to be noted that the foregoing embodiments are merely intended to describe the technical solutions of this application, but not to limit this application. Although this application is described in detail with reference to the foregoing embodiments, a person of ordinary skill in the art understands that modifications may still be made to the technical solutions described in the foregoing embodiments or equivalent replacements may still be made to some technical features thereof, without making the essence of the corresponding technical solutions depart from the spirit and scope of the technical solutions of the embodiments of this application.

21

What is claimed is:

1. An electrode assembly comprising:

at least two electrode plates, comprising a first electrode plate and a second electrode plate that are of opposite polarities, the first electrode plate and the second electrode plate being wound around a winding axis to form a multilayer structure, the multilayer structure comprising an accommodation cavity extending along a direction of the winding axis, the accommodation cavity being configured to accommodate an electrolytic solution, wherein, the electrode assembly further comprises at least one guide path extending along a first direction, the first direction being a direction perpendicular to the winding axis, and the guide path being configured to guide the electrolytic solution out of the accommodation cavity, an active material region of the first electrode plate and an active material region of the second electrode plate are wound to form a body region, the body region comprises a plurality of stacked active material portions, a non-active material region of the first electrode plate or a non-active material region of the second electrode plate is wound to form a tab region, the tab region comprises a plurality of stacked tab portions, and the accommodation cavity runs through the body region and the tab region along the direction of the winding axis, the plurality of tab portions comprise a plurality of consecutively arranged first tab portions, each first tab portion being provided with a plurality of first holes that run through the first tab portion along a thickness direction of the first tab portion, and the first holes of all the first tab portions are configured to be arranged opposite to each other along the first direction to form the guide path, in a direction from outside to inside of the electrode assembly, apertures of the plurality of first holes decrease progressively, the guide path located at an outer side of the electrode assembly is larger than at an inner side of the electrode assembly.

2. The electrode assembly according to claim 1, wherein the electrode assembly is a cylindrical structure, and the first direction is a radial direction of the cylindrical structure.

3. The electrode assembly according to claim 1, wherein an outermost tab portion in the tab region is the first tab portion, and an outer end of the guide path is in direct communication with an external space of the electrode assembly.

4. The electrode assembly according to claim 1, wherein an innermost tab portion in the tab region is the first tab portion, and an inner end of the guide path is in direct communication with the accommodation cavity.

5. The electrode assembly according to claim 1, wherein the plurality of tab portions further comprise a plurality of consecutively arranged second tab portions, the second tab portions being not provided with the first hole, all the plurality of second tab portions are located between the guide path and the accommodation cavity, and an inner end of the guide path communicates to the accommodation cavity through a gap between two adjacent second tab portions.

6. The electrode assembly according to claim 1, wherein the accommodation cavity comprises a first accommodation cavity located in the body region and a second accommodation cavity located in the tab region, and, along a direction perpendicular to the winding axis, a size of the second accommodation cavity is larger than a size of the first accommodation cavity.

7. The electrode assembly according to claim 1, wherein a central axis of the accommodation cavity coincides with the winding axis.

8. A battery cell comprising: a housing, an end cap, and the electrode assembly according to claim 1, wherein an opening is made at an end of the housing along the direction of the winding axis, the end cap is configured to close the opening, and the electrode assembly is disposed in the housing.

9. The battery cell according to claim 8, wherein, an injection hole is made on the end cap, and the injection hole is disposed opposite to the accommodation cavity along the direction of the winding axis, so that the electrolytic solution is able to enter the accommodation cavity through the injection hole.

10. A battery comprising the battery cell according to claim 8.

11. An electrical device comprising the battery according to claim 10, and the battery is configured to provide electrical energy.

12. A method for manufacturing an electrode assembly, wherein the method comprises:

providing at least two electrode plates, comprising a first electrode plate and a second electrode plate that are of opposite polarities; and winding the first electrode plate and the second electrode plate around a winding axis to form a multilayer structure, wherein the multilayer structure comprises an accommodation cavity extending along a direction of the winding axis, the accommodation cavity is configured to accommodate an electrolytic solution, at least one guide path extending along a first direction is formed in the electrode assembly after the winding, the first direction is a direction perpendicular to the winding axis, and the guide path is configured to guide the electrolytic solution out of the accommodation cavity, wherein an active material region of the first electrode plate and an active material region of the second electrode plate are wound to form a body region, the body region comprises a plurality of stacked active material portions, a non-active material region of the first electrode plate or a non-active material region of the second electrode plate is wound to form a tab region, the tab region comprises a plurality of stacked tab portions, and the accommodation cavity runs through the body region and the tab region along the direction of the winding axis, the plurality of tab portions comprise a plurality of consecutively arranged first tab portions, each first tab portion being provided with a plurality of first holes that run through the first tab portion along a thickness direction of the first tab portion, and the first holes of all the first tab portions are configured to be arranged opposite to each other along the first direction to form the guide path, in a direction from outside to inside of the electrode assembly, apertures of the plurality of first holes decrease progressively, the guide path located at an outer side of the electrode assembly is larger than at an inner side of the electrode assembly.

* * * * *